United States Patent

[11] 3,603,462

[72] Inventor Theo Moser
 Stuttgart, Germany
[21] Appl. No. 29,167
[22] Filed Apr. 16, 1970
[45] Patented Sept. 7, 1971
[73] Assignee Hofliger & Karg
 Waiblinger, near Stuttgart, Germany
[32] Priority Apr. 17, 1969
[33] Germany
[31] P 19 19 521.2

[54] TRANSFER ARRANGEMENT
 6 Claims, 2 Drawing Figs.
[52] U.S. Cl. ................................................. 214/8.5 A,
 198/35, 214/8.5 F
[51] Int. Cl. ....................................................... B65g 59/12
[50] Field of Search ........................................... 214/8.5 A,
 8.5 F, 8.5 R; 198/24, 35

[56] References Cited
UNITED STATES PATENTS
1,492,864  5/1924  Straight ................... 198/31.3
3,517,481  6/1970  Weber ...................... 214/8.5 F Primary Examiner—Gerald M. Forlenza
Assistant Examiner—George F. Abraham
Attorney—Michael S. Striker

ABSTRACT: An upright hollow structure is mounted for pendulous movement about an axis intersecting it in the region of its upper end portion. A supply introduces a succession of discrete stackable articles into the upper end of the structure so that they form in the latter an upright stack. Receivers each having an inlet travel in the region of the lower end of the structure in a path paralleling the plane of pendulous movement thereof. An ejecting device moves with the structure and serves to eject through an opening provided in the lower end portion thereof a predetermined number of articles from the stack into the respective receivers when the inlets thereof are in registry with the outlet opening of the structure.

TRANSFER ARRANGEMENT

BACKGROUND OF THE INVENTION

The present invention relates generally to a transfer arrangement, and more particularly to an arrangement for transferring discrete articles from a supply to a receiver.

In many applications, for instance in packaging machines, large quantities of identical discrete articles must be transferred from a supply to a receiver. This is for instance true in the supply of deep-drawn packages from the deep-drawing apparatus to a packaging apparatus where goods to be packaged are introduced into them. The present invention will be described hereafter with respect to such an arrangement and to such packages, but it is to be understood that the invention has broader applications and is generally concerned with the transfer of discrete articles between any two apparatuses and irrespective of the type of article involved as long as the articles are stackable.

In the conventional transfer of deep-drawn packages from the deep-drawing apparatus to a packaging apparatus the packages leaving the deep-drawn apparatus are deposited on a conveyor belt or the like and advanced by the same. They are thus successively arranged on the conveyor which supplies them to a device intended to engage them individually or in groups and to introduce them into the receivers of the packaging apparatus. It has been found that this approach frequently leads to difficulties because the successively arranged packages on the conveyor tend to shift with reference to one another so that they overlap to a greater or lesser degree. When this occurs they cannot be properly engaged by the device which is to insert them into the receivers, and when the device then attempts to effect such insertion blocking of the inlet of the receiver or other difficulties arise. A further disadvantage of these known constructions is the fact that if, for instance, the operation of the packaging machine must be temporarily halted because of a defect or the like, the continuously supplied packages would tend to accumulate on the conveyor and back up at the transfer device with the result that they would eventually fall off the conveyor. This can of course be avoided but requires a relatively complicated mechanism which adds to the expense of the overall apparatus.

To overcome some of these disadvantages it has been proposed to establish intermediate the supply and the user device—that is the packaging apparatus—a transfer stack of the packages. The newly arriving packages are added to the stack at the top and from the bottom of the stack quantities of packages are withdrawn and inserted into the receivers of the packaging apparatus.

However, the arrangements of the stack which are known from the prior art are suitable only if the receivers are advanced intermittently. Where the receivers are advanced continuously in the interest of greater productivity of the packaging apparatus, these prior art arrangements are unsuitable.

SUMMARY OF THE INVENTION

It is accordingly, an object of the present invention to provide an arrangement of the character under discussion which overcomes the aforementioned disadvantages.

More particularly, it is an object of the present invention to provide a transfer arrangement of the type in question which is not possessed of these disadvantages.

Still more specifically, it is an object of the invention to provide a transfer arrangement utilizing a transfer stack of the articles in question, but which arrangement can be used with receivers which advance continuously rather than intermittently.

In pursuance of the above objects, and others which will become apparent hereafter, one feature of the invention resides in an arrangement of the character under discussion which, briefly stated, comprises a supply means for supplying a succession of discrete stackable articles at a first higher elevation. Receiving means travels continuously in a path at a lower second elevation and is adapted to receive a predetermined number of such articles. Stack-forming means is provided and has a lower opening adjacent to the path and facing towards the receiving means, and an upper opening for receiving the articles so that the latter form in the stack-forming means a stack extending from the lower opening to the upper opening. Mounting means mounts the stack-forming means for pendulous movement in a plane parallelling the direction of travel of the receiving means. Ejecting means is mounted for movement with the stack-forming means and operative for ejecting the requisite predetermined number of articles from the stack into the receiving means when the latter is in registry with the aforementioned lower opening.

According to the invention, it is preferable that the mounting means cooperate with the stack-forming means in such a manner that the latter pivots about a pivot axis intersecting it in the region of its upper end portion so that when the stack-forming means performs its pendulous movement, the upper opening undergoes a minimum of displacement in space.

The stack-forming means is an upright hollow structure of generally tubular configuration—which term is not intended to imply a circumferentially complete outer wall—and has a downwardly facing lower open end below which there is mounted a supporting plate on which the stack of packages in the stack-forming means rests. To permit a variation in the number of packages which are ejected from the stack during each operation of the ejecting means, the stack-forming structure and/or the support plate are adjustable relative to one another in upright direction.

To improve the throughput of the arrangement it is possible to utilize two or more of the stack-forming structures which are then so mounted that they perform pendulous movements in unison.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
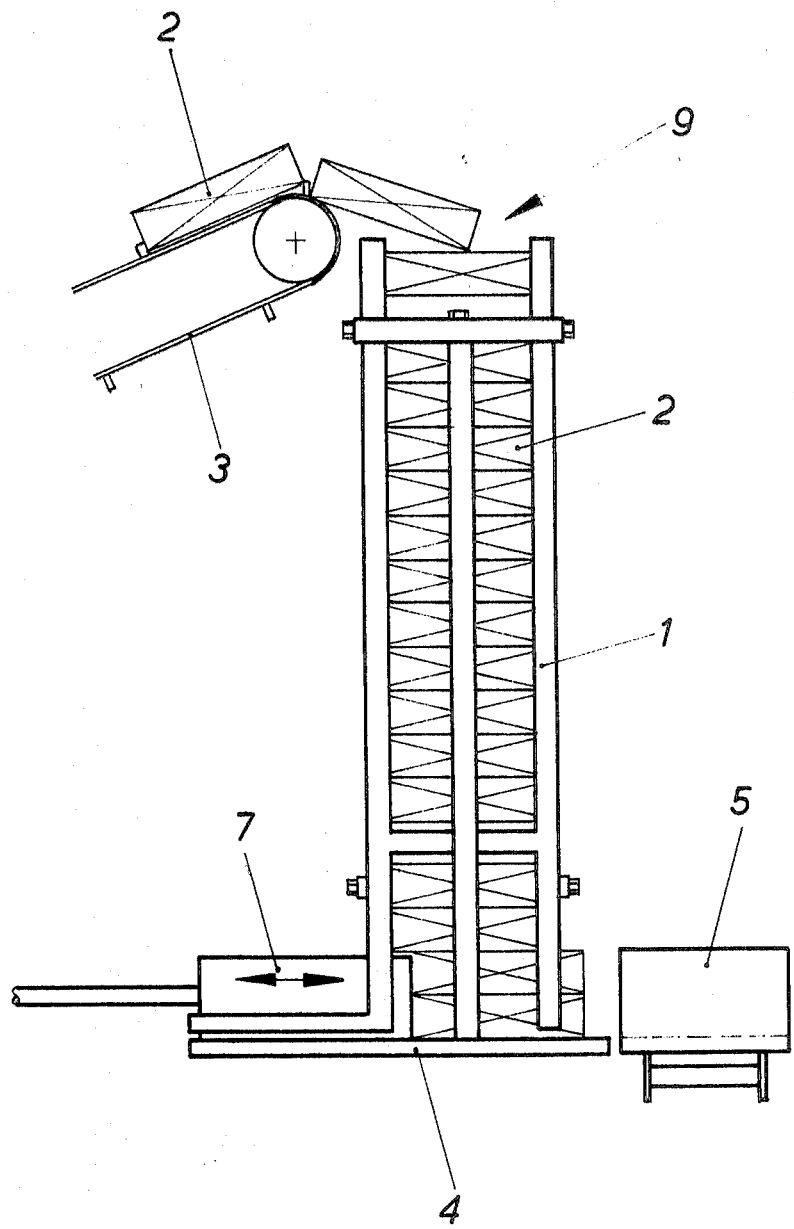
FIG. 1 is a diagrammatic side elevational view of an arrangement according to the present invention.

Discussing now the drawings in detail, it is emphasized, firstly, that they are of a purely diagrammatic nature and that all such matter which is not believed to be required for an understanding of the present invention has been omitted.

With this in mind, it will be seen that reference numeral 1 identifies an upright substantially tubular structure into the upper opening 9 of which discrete stackable articles 2—here assumed to be packages—are introduced by a supply means in the form of a conveyor belt 3 provided with the illustrated entrainment projections. The lower end of the structure 1 is open, as illustrated, and arranged below it is a support plate 4 which supports the stack of articles 2 in the structure 1. This stack is a transfer stack, as will be readily appreciated.

The support plate 4 is located in the general plane of advancement of the receivers 5 which are associated with the diagrammatically suggested (see FIG. 2) packaging machine 6. The receivers 5, of which several are shown in FIG. 2, continuously travel in the direction illustrated by the single arrow in FIG. 2, moved by suitable moving means which forms no part of the present invention.

In the region of the lower end of the structure 1 there is provided ejecting means comprising a member 7 which is slidable in the direction of the double-headed arrow shown in FIG. 1. When the member 7 is advanced towards the right in FIG. 1, it ejects a predetermined number of articles 2 from the lower end of the stack out of the structure 1 and into the inlet of whichever receiver 5 registers with the outlet opening of the structure 1 through which the ejection takes place.

Figure 2:
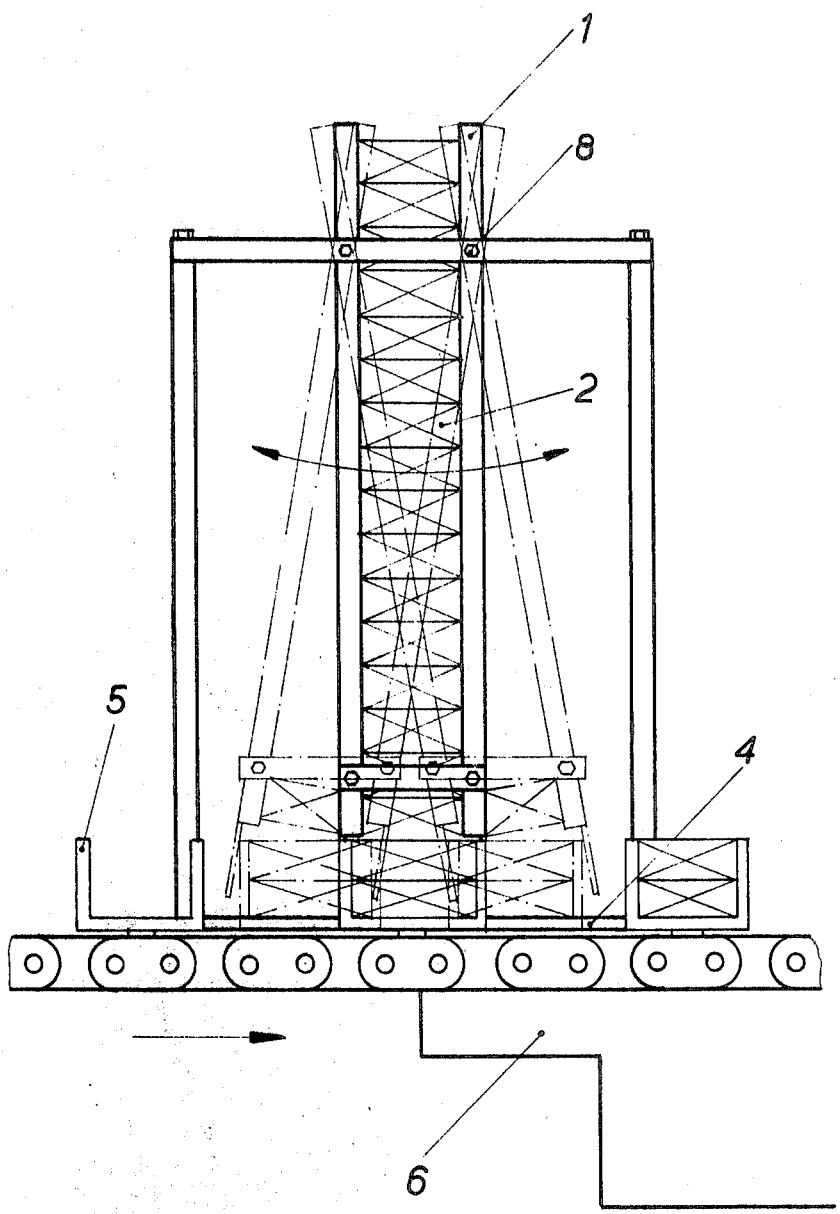
FIG. 2 is a similarly diagrammatic elevational view of the arrangement in FIG. 1, looking from right to left.

Because the receivers 5 travel continuously in the manner illustrated in FIG. 2, the structure 1 is mounted for pendulous movement in a plane paralleling the path of movement of the receivers 5. The pivot axis 8 about which this pendulous movement (see double-headed arrow in FIG. 2) takes place intersects the structure 1 in the region of the upper end portion thereof in such a manner that only the lower portions of the structure 1 perform significant movements (see the broken-line opposite end positions shown in FIG. 2) whereas the upper end portion with the inlet opening 9 performs very little movement so that the inlet opening 9 under goes minimum displacement of its position in space.

To make it possible t adjust the number of articles 2 which are ejected during each operation of the member 7, the support plate 4 and/or the structure 1 are vertically displaceable by any suitable and therefore not illustrated means. When such a displacement is effected, the member 7 is either replaced with a different member of greater or lesser height, depending upon whether more or fewer articles are to be ejected at one time, or the member 7 can be made adjustable so that its height may be varied.

While it has not been illustrated how the structure 1 performs its pendulous movement, it will be appreciated that the necessary means therefor are well within the purview of those having skills in this field. The essential point is that the lower outlet opening of the structure 1 through which the articles 2 are to be ejected by the member 7 be capable of remaining in registry with the inlet opening of any given receiver 5 while the latter travels continuously in its path, until such time as the transfer of the articles from the structure 1 into the receiver 5 is completed. One complete operating stroke of the structure 1 is illustrated in FIG. 2 by the opposite end positions signified in broken lines.

To improve the output of the arrangement, two or more of the structures 1 may be arranged adjacent to one another and perform pendulous movements in unison. In this case each of the structures 1 will be provided with its own member 7, which latter of course shares in the pendulous movement of the respective structure 1.

The present invention not only provides the advantages which have been discussed earlier as desirable, but also guarantees that during relatively brief operating difficulties, for instance brief shutdown of the packaging apparatus 6, the supply of articles 2 by the conveyor 3 can be continued without leading to difficulties. This simply results in an increase in the vertical height of the stack in the respective structure 1. Of course, if the shutdown continues for longer periods of time, where continued supply of articles 2 would cause the stack to rise above the inlet opening of the structure 1, provision must be and is made in connection with the source of supply—for instance the deep-drawing apparatus—for diverting the produced packages. For instance, an internal storage associated with the deep-drawing machine may be provided for such occasions, and quantities of packages which are stored under such circumstances can subsequently be used up by operating the illustrated device and the associated packaging machine 6 at increased speed.

Naturally, modifications in the illustrated embodiments will suggest themselves readily to those skilled in the art. As just one example of a possible modification, it is pointed out that the articles 2 need of course not be supplied by the conveyor 3 but could be advanced in different manner, just as they are not necessarily packages and not necessarily produced by deep-drawing apparatus.

It will be understood that each of the elements described above, or two or more together, may also find a useful application in other types of constructions differing from the types described above.

While the invention has been illustrated and described as embodied in a transfer arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended

I claim:

1. An arrangement of the character disclosed, comprising supply means for supplying a succession of discrete stackable articles at a first higher elevation; receiving means traveling continuously in a path at a lower second elevation and adapted to receive a predetermined number of said articles; stack-forming means having a lower opening adjacent to said path and facing towards said receiving means, and an upper opening for receiving said articles so that the latter form in said stack-forming means a stack extending from said lower opening towards said upper opening; mounting means mounting said stack-forming means for pendulous movement in a plane parallelling the direction of travel of said receiving means; and ejecting means mounted for movement with said stack-forming means and operative for ejecting said predetermined number of articles from said stack into said receiving means when the latter is in registry with said lower opening.

2. An arrangement as defined in claim 1, said receiving means traveling continuously in said path.

3. An arrangement as defined in claim 2, said receiving means comprising a plurality of receptacles arrayed for consecutive travel in said path and each having an inlet; and said ejecting means being operative for ejecting said predetermined number of articles with the successive receptacles in response to registry of the respective inlet with said lower opening.

4. An arrangement as defined in claim 2, said mounting means mounting said stack-forming means for said pendulous movement about an axis intersecting said stack-forming means in the region of said upper opening.

5. An arrangement as defined in claim 2, said stack-forming means comprising a tubular first portion having a downwardly facing open lower end, and a plate-shaped second portion arranged below said open lower end for supporting said stack of articles.

6. An arrangement as defined in claim 5, at least one of said portions being adjustable in an upright plane.